Aug. 10, 1954 J. AVINS 2,686,221
SIMPLIFIED COMBINATION FM AND TELEVISION RECEIVER
Filed Nov. 3, 1949
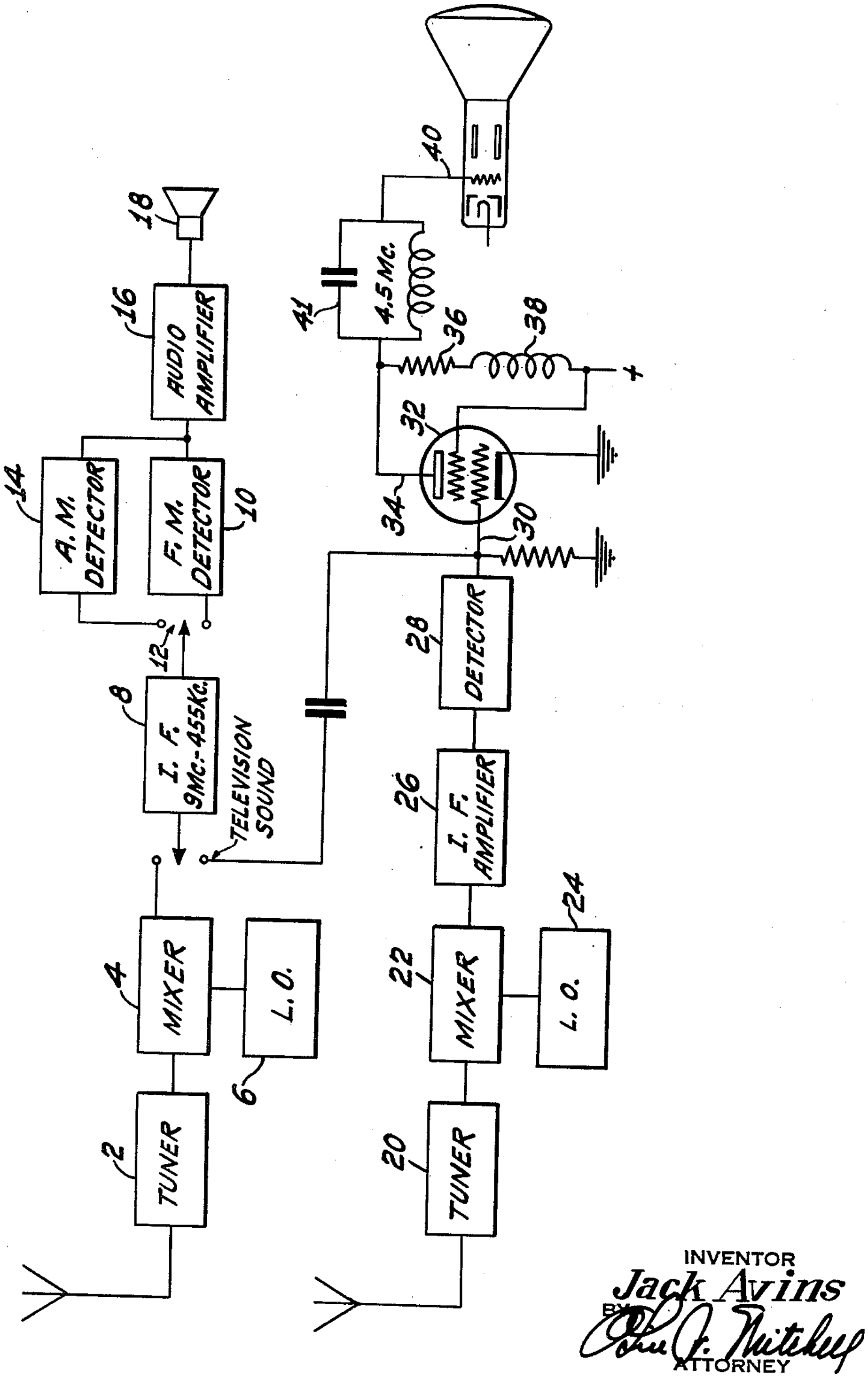
INVENTOR
Jack Avins
BY [signature]
ATTORNEY Patented Aug. 10, 1954

2,686,221

UNITED STATES PATENT OFFICE 2,686,221

SIMPLIFIED COMBINATION FM AND TELEVISION RECEIVER

Jack Avins, Staten Island, N. Y., assignor to Radio Corporation of America, a corporation of Delaware Application November 3, 1949, Serial No. 125,350

The terminal fifteen years of the term of the patent to be granted has been disclaimed 1 Claim. (Cl. 178—5.8)

This invention relates to a combination receiver for receiving and detecting frequency modulated signals, amplitude modulated signals and television signals.

According to present standards, the broadcast band in which amplitude modulated signals are transmitted extends from 540 to 1600 kilocycles and the two television bands extend from 54 megacycles to 88 megacycles and from 174 megacycles to 216 megacycles. Between 88 megacycles and 108 megacycles, the signals are of the frequency modulation type. In order that complete coverage may be given for standard programs, all four of these bands must be received. If separate receivers are used for each band, a large number of component parts is required and the cost is excessive.

Therefore, it is the purpose of this invention to provide a combination receiver capable of detecting signals in any of the above mentioned bands that has a minimum number of component parts. This and other advantages will be seen from a reference to the drawing that shows the receiver of this invention in schematic form.

Under present television standards, a first carrier is amplitude modulated with the video signals that correspond to the optical information to be transmitted. A second carrier that is 4.5 megacycles above the first is frequency modulated with the audio intelligence. If both of these carriers are passed through a common tuner, mixer, IF strip and detector of suitable design such as described in the Parker Patent No. 2,448,908 video signals representing both the video and audio portions of the program are developed at the output of the detector in a bandwidth of approximately 4.5 megacycles. The frequencies from zero to approximately 4.25 megacycles are devoted to conveying the video intelligence, whereas the frequency band that lies within 25 kilocycles on either side of the beat frequency between the two carriers is devoted to the aural intelligence. Because the video and aural parts of the program lie in different frequency bands, it is possible to separate them, the video signals being applied to the grid of a kinescope or other suitable device and the aural signals being applied to an audio amplification system.

In the case where it is desired to receive signals in the FM band, the radio frequency signals are reduced to an intermediate frequency by means of a mixer and local oscillator, as is well known in the art, and after the output of the intermediate frequency amplifier has been passed through a discriminator, or a suitable frequency modulation detector, the audio intelligence so derived is fed through an audio amplification channel.

Now, if the intermediate frequency channel of an FM receiver is tuned to the frequency band of the aural intelligence produced at the second detector of an intercarrier television receiver or one of its harmonics, the need for a separate audio channel of the television receiver can be eliminated. This is accomplished by introducing the frequency bearing the audio intelligence to the input of the IF channel of the FM receiver.

In order that images may be reduced in the FM reception, it is desirable that the difference between the local oscillator and the frequency to be received be in excess of half the total FM band, and, for this reason, it is desirable to use at least the second harmonic of the 4.5 megacycles beat frequency that bears the aural intelligence at the output of the second detector of an intercarrier television receiver.

A standard FM receiver is shown in the drawing in block diagram and schematic form, the numeral 2 indicating an FM or AM tuner, the numeral 4 indicating the mixer and the local oscillator being indicated by the numeral 6. The output of the mixer 4 is fed to an IF strip 8 and its output, in turn, is fed to an FM detector 10. If AM signals are also to be received, a suitable switch arrangement such as indicated by numeral 12 serves to supply the output of the IF amplifier to an AM detector 14. The output of either type of detector is fed to suitable audio amplification channel 16 which, in turn, may supply a speaker 18.

The television receiver is comprised of a tuner 20, a mixer 22 that receives signals from the tuner and the local oscillator 24, an IF strip 26 that amplifies the output of the mixer 22, and a detector 28 that develops video signals. In accordance with the principles of intercarrier sound receivers, the tuner, mixer, IF amplifier and detector are capable of operating on both the amplitude modulated video carrier and the frequency modulated audio carrier, which differ in frequency by 4.5 megacycles. The output of the IF amplifier therefore comprises two intermediate frequency carriers, one being amplitude modulated, and the other being frequency modulated. After these intermediate frequency carriers are passed through the detector 28 the amplitude modulated signals lie within a bandwidth from zero to 4 megacycles and the frequency modulation signals lie within a bandwidth that is within approximately 25 kilocycles on either side of 4.5 megacycles. The output of the detector 28 comprises an amplitude modulated D. C. wave that may have frequency components within it lying between zero and 4 megacycles. In addition, there is an A. C. wave representing the beat frequency between the two IF carriers.

The output of the detector 28, as shown, is applied to the grid 30 of the video amplification stage 32. Although one stage is shown, it is to be realized that as many stages may be used as are necessary. The plate 34 of the stage 32 is connected to a source of positive potential via load resistor 36 and a peaking inductance 38. Video signals developed across this plate load are applied to grid 40 of any suitable type of image reproducing tube. In order to prevent the frequency modulated beat frequency from appearing at the grid of the kinescope, a parallel LC circuit 41 tuned to 4.5 megacycles is inserted in series between a plate 34 and a grid 40.

Due to the fact that a detector is a non-linear device, harmonics of the 4.5 megacycles beat frequency are also present in the video detector and video amplifier system. In the diagram, the 9 megacycle second harmonic is shown as picked up at the second detector output and fed to the IF amplifier input through a small condenser. In an alternative arrangement, the 9 megacycle signal may be amplified by the video amplifier before being fed to an additional 9 megacycle IF amplifier. The harmonic of the beat frequency thus selected may be amplified by the intermediate amplifier 8 and supplied to the frequency modulation detector 10 and from 10 to any suitable audio system. The video signals present will not pass through the IF channel because it is not responsive to them. The intermediate frequency amplifier 8 may be of the AM-FM type having a parallel circuit resonant to 9 megacycles intermediate carrier for FM reception in series with a parallel circuit resonant to 455 kilocycles for AM reception.

The FM signal representing the audio intelligence in a television broadcast varies from the beat frequency by 25 kilocycles in either direction, whereas in ordinary FM programs it varies 75 kilocycles on either side of the carrier. However, when the second harmonic of the beat frequency is used the variation is doubled and varies within plus or minus 50 kilocycles of the second harmonic of the beat frequency and is thus compatible with the bandpass required of the IF channel 8. If the third harmonic is used, the variation of the spread in frequency is identical with that obtainable with the ordinary FM standards.

Having thus described my invention, what is claimed is:

A combination receiver comprising: a tuner, a mixer, an intermediate frequency amplifier and second detector of an intercarrier sound television receiver, said second detector being capable of conditionally delivering an intercarrier beat frequency carrier modulated with aural intelligence; a frequency modulation receiver including a tuner, mixer and intermediate frequency amplifier; means for deriving a harmonic of the intercarrier beat frequency carrier when present in said second detector, said frequency modulation receiver intermediate frequency amplifier being tuned to said intercarrier beat frequency harmonic; and switching means to selectively connect the output of the mixer of the frequency modulation receiver or the output of said means for deriving the harmonic of the intercarrier beat frequency carrier to the frequency modulation receiver intermediate frequency amplifier.

References Cited in the file of this patent

UNITED STATES PATENTS

| Number | Name | Date |
|---|---|---|
| 2,155,126 | Goldmark | Apr. 18, 1939 |
| 2,186,455 | Goldmark | Jan. 9, 1940 |
| 2,257,282 | Smith | Sept. 30, 1941 |
| 2,270,652 | Espley | Jan. 20, 1942 |
| 2,356,201 | Beers | Aug. 22, 1944 |
| 2,448,908 | Parker | Sept. 7, 1948 |
| 2,491,808 | Fyler | Dec. 20, 1949 |
| 2,501,122 | Corrington | Mar. 21, 1950 |
| 2,528,222 | Foster | Oct. 31, 1950 |
| 2,591,264 | Janssen | Apr. 11, 1952 |